US010227746B2

(12) United States Patent
Van Dyk et al.

(10) Patent No.: US 10,227,746 B2
(45) Date of Patent: Mar. 12, 2019

(54) METHOD OF LIMITING PERMEABILITY OF A MATRIX TO LIMIT LIQUID AND GAS INFLOW

(71) Applicants: RELBORGN PTY LTD, Claremont (AU); TRIOMVIRI PTY LTD, Claremont (AU)

(72) Inventors: Deon Van Dyk, Salter Point (AU); Nico Johan Grobler, Kensington (AU)

(73) Assignees: Relborgn Pty Ltd, Claremont, WA (AU); Triomviri Pty Ltd, Claremont, WA (AU)

(*) Notice: Subject to any disclaimer, the term of this patent is extended or adjusted under 35 U.S.C. 154(b) by 0 days.

(21) Appl. No.: 14/403,363

(22) PCT Filed: May 23, 2013

(86) PCT No.: PCT/AU2013/000541
§ 371 (c)(1),
(2) Date: Nov. 24, 2014

(87) PCT Pub. No.: WO2013/173876
PCT Pub. Date: Nov. 28, 2013

(65) Prior Publication Data
US 2015/0167269 A1 Jun. 18, 2015

(30) Foreign Application Priority Data

May 23, 2012 (AU) .................................. 2012902131

(51) Int. Cl.
*E02D 3/12* (2006.01)
*E02D 31/10* (2006.01)
(Continued)

(52) U.S. Cl.
CPC ............... *E02D 3/12* (2013.01); *C09K 8/44* (2013.01); *C09K 8/50* (2013.01); *C09K 8/508* (2013.01);
(Continued)

(58) Field of Classification Search
CPC .. C09K 8/44; C09K 8/50; C09K 8/508; E02D 3/12; E02D 31/10; E02D 31/14; E02D 37/00; E21B 33/138
See application file for complete search history.

(56) References Cited

U.S. PATENT DOCUMENTS 3,730,271 A    5/1973    Gall
5,145,012 A *    9/1992    Hutchins ............... C09K 8/50
                                                                    166/270

(Continued)

FOREIGN PATENT DOCUMENTS

AU    2013266018    9/2014
EP    2877637    6/2015

(Continued)

OTHER PUBLICATIONS

Ajalloeian R., et al. Evaluation of hydrojacking and hydrofracturing behavior in Aghajari formation (Gotvand dam site foundation), Iran. Journal of Geology and Mining Research, 2011, vol. 3, No. 3, pp. 46-53.

(Continued)

*Primary Examiner* — Benjamin F Fiorello
(74) *Attorney, Agent, or Firm* — Ballard Spahr LLP

(57) ABSTRACT

A method of limiting or reducing permeability of a matrix to liquid or gas flow is described. The method includes limiting inflow of water and/or gas into passages such as cavities, fissures, voids and the like, encountered in formations such as geological formations. The method includes steps of measuring one or more parameters relating to the matrix and (Continued)

selecting one or more components of a multi-component sealing composition with reference to the measured parameters. The selected components are introduced into the passage where it is set or coagulated to form a seal. Method is also described whereby the passage is sealed with a sealing composition comprising a grout component and a grout curing agent. A portion of the grout component is mixed with a portion of grout curing agent, the ratio of each being selected with reference to the measured parameters. The combined grout/curing agent are introduced into the passage where rate of curing or setting is controlled by modifying the ratio.

34 Claims, 6 Drawing Sheets

(51) Int. Cl.
    *E02D 37/00*        (2006.01)
    *E02D 31/14*        (2006.01)
    *E21B 33/138*       (2006.01)
    *C09K 8/50*         (2006.01)
    *C09K 8/508*        (2006.01)
    *C09K 8/44*         (2006.01)

(52) U.S. Cl.
    CPC ............ *E02D 31/10* (2013.01); *E02D 31/14* (2013.01); *E02D 37/00* (2013.01); *E21B 33/138* (2013.01)

(56) References Cited

U.S. PATENT DOCUMENTS

| | | | |
|---|---|---|---|
| 6,419,017 B1 | 7/2002 | Metcalf et al. | |
| 6,801,814 B1* | 10/2004 | Wilson | E02D 3/12 |
| | | | 175/71 |
| 7,997,342 B2* | 8/2011 | Welton | C09K 8/68 |
| | | | 166/279 |
| 8,224,631 B2* | 7/2012 | Stankus | E21C 41/16 |
| | | | 405/259.1 |
| 2003/0163257 A1 | 8/2003 | Ravi et al. | |
| 2005/0269080 A1 | 12/2005 | Cowan | |
| 2006/0163257 A1 | 7/2006 | Golbert | |
| 2006/0219405 A1 | 10/2006 | Nguyen et al. | |
| 2006/0234871 A1 | 10/2006 | Dalrymple et al. | |
| 2008/0096774 A1* | 4/2008 | Tabary | C09K 8/5083 |
| | | | 507/221 |
| 2008/0269390 A1* | 10/2008 | Weitzel | C04B 24/085 |
| | | | 524/300 |
| 2009/0137431 A1 | 5/2009 | Reddy et al. | |
| 2011/0115166 A1* | 5/2011 | Grobler | C08K 5/09 |
| | | | 277/316 |

FOREIGN PATENT DOCUMENTS

| | | |
|---|---|---|
| GB | 2355741 A | 5/2001 |
| JP | S63304086 | 12/1988 |
| JP | H10212480 | 8/1998 |
| JP | H10330750 | 12/1998 |
| JP | 2004041924 | 2/2004 |
| JP | 2004075754 | 3/2004 |
| JP | 2007025964 | 2/2007 |
| JP | 2008240424 | 10/2008 |
| JP | 2010140552 | 6/2010 |
| JP | 2011256534 | 12/2011 |
| JP | 2012077309 | 4/2012 |
| JP | 5267111 | 8/2013 |
| JP | 5284810 | 9/2013 |
| JP | 2015525314 | 9/2015 |
| WO | 2009146493 A1 | 12/2009 |
| WO | WO-2009/146493 A1 | 12/2009 |
| WO | WO-2013/173876 A1 | 11/2013 |

OTHER PUBLICATIONS

Chau, Thanh-Tam; International Search Report from International patent application No. PCT/AU2013/000541; dated Aug. 2, 2013; pp. 1-3; Australian Patent Office.

Chau, Thanh-Tam; Written Opinion from International patent application No. PCT/AU2013/000541; dated Aug. 2, 2013; pp. 1-4; Australian Patent Office.

Ajalloeian R., et al., Evaluation of hydrojacking and hydrofracturing behavior in Aghajari formation (Gotvand dam site foundation), Iran, Journal of Geology and Mining Research (2011), 3(3):46-53.

International Search Report and Written Opinion dated Aug. 2, 2013 by the International Searching Authority for International Application No. PCT/AU2013/000541, which was filed on May 23, 2013 and published as WO/2013/173876 dated Nov. 28, 2013 (Applicant—Relborgn PTY LTD) (16 pages).

International Preliminary Report on Patentability dated Nov. 25, 2014 by the International Searching Authority for International Application No. PCT/AU2013/000541, which was filed on May 23, 2013 and published as WO/2013/173876 dated Nov. 28, 2013 (Applicant—Relborgn PTY LTD) (9 pages).

European Search Report dated Mar. 24, 2016 by the European Patent Office for EP Application No. 13794619, which was filed on May 23, 2013 and published as EP 2877637 A1 dated Jun. 3, 2015 (Applicant—Relborgn PTY LTD) (8 pages).

* cited by examiner

METHOD OF LIMITING PERMEABILITY OF A MATRIX TO LIMIT LIQUID AND GAS INFLOW

FIELD OF THE INVENTION

The present invention relates to a method of limiting or reducing permeability of a matrix to liquid or gas inflow, including limiting inflow into passages such as cavities, fissures, voids, open features and pore spaces encountered in formations such as geological formations.

BACKGROUND TO THE INVENTION

Methods of attempting to substantially seal or otherwise reduce the permeability of a matrix such as concrete, rock or soil are known. For example, regular cement based suspension grouts can be introduced into voids, opens spaces and pore spaces around a mine shaft in order to attempt to seal fissures or reduce the permeability of unconsolidated sand or soil around the shaft, thereby limiting liquid inflow into the shaft.

Typically, a volume of grout or sealing composition product is transported to the site to be treated and applied to the passage or passages requiring sealing to prevent water inflow. Application typically involves pumping of grout to the passage or passages. Sealing composition which is generally premixed prior to delivery of the site often provides less than satisfactory results in terms of preventing or reducing water inflow. For example, injection or introduction of a cement based grout, known to have suitable properties in sealing passages, can cause hydrofracturing if applied to an unconsolidated matrix such as sand or sandstone. This can create seams of grout within the matrix, leaving sections of unconsolidated matrix on either side of the created seams. Such an application has minimal impact on reducing the ability for water to pass through the matrix and hence into a shaft that has been sunk through the matrix.

There is also difficulty in use of premixed grouts in that setting time cannot be controlled or varied either at all or with any reliable degree of accuracy. This is detrimental in that known premixed grouts are generally capable only of providing a "one size fits all" sealing solution. Since there is such a wide range of conditions that can be experienced when seeking to limit permeability of a matrix so as to limit liquid inflow, a 'one size' approach to all types of inflow problems is inherently unsuitable.

Traditional and pre-mixed cement and bitumen based grouts can additionally fail to adequately penetrate the passage or passages to be sealed. At least part of this failure can be attributed to the sealing composition simply failing to penetrate through the matrix to a required depth. Rate of setting of the sealing composition can also affect whether or not the sealing composition is able to adequately prevent or practically reduce water inflow.

For example, it is desirable when applying a grout to reduce permeability in a sand formation, that the grout can be able to permeate a suitable distance through the formation prior to setting. If setting occurs prematurely, the grout is unable to adequately penetrate the matrix and create sufficient adhesion of particles in the matrix to form an effective seal to water inflow.

Applicant's earlier patent AU 739427 utilises a composition which includes latex and wherein viscosity of the composition is increased with rate of shear as the composition penetrates into the passage. Whilst this can assist in controlling excessive grout spread within the matrix and help to ensure that the bulk of the grout remains within the target zone of the matrix, it still presents a somewhat generic approach to controlling set times of the grout once introduced into the passage. Further, set time of the grout cannot be regulated or varied with any degree of reliability to accommodate, for example, specific needs or requirements of the application at hand.

Another known method of preventing or limiting water inflow into an excavation in a ground formation is the method of ground freezing. This method is often the preferred method of ground support in vertical shaft construction. The method utilises water in situ in pore spaces of the ground formation and freezes it so that the water acts as a bonding agent, fusing together particles of soil or rock to create a solid mass with substantial impermeability. Whilst the ground is frozen, a concrete liner is usually constructed about the path of the shaft.

Proper execution of this method, particularly at depth, is complex and requires substantial capital outlay. After freezing and construction of the concrete liner and before the ground is permitted to thaw, absolute water tightness must be established in the concrete liner. If it is not water tight, seepage can dissolve matrix from behind the shaft lining, increasing the leakage path and ultimately flooding the mine. Salt mines in particular are known to be susceptible to this due to the salt dissolving and mines have been lost in this manner.

These aforementioned problems are also applicable and indeed may be more pronounced if it is desired to limit or reduce permeability of a matrix so as to reduce or limit flow of gas. For example, in a hydraulic fracturing (hydrofracturing) operation to extract hydrocarbon gas reserves from a reservoir, it may be desirable to limit the permeability of sections of ground surrounding the wellbore so as to prevent undesirable or disadvantageous flow of gas. It may also be desired to seal passages or pore spaces in a ground formation to seal in hydrocarbon or other gases in oil and gas seams. Known methodologies for reducing permeability of the ground to prevent or limit this have thus far been found to be largely ineffective or unreliable. In view of the fact that there is ever increasing reliance on methods such as hydrofracturing, there is an increased need for capacity to reliably contain gas within a formation and prevent ingress into inappropriate regions.

It is therefore an object of the present invention to provide a method of limiting or reducing permeability of a matrix to limit or reduce liquid and/or gas inflow, including limiting or reducing gas and/or liquid inflow within a passage in the matrix that reduces the aforementioned problems experienced with prior art methods.

SUMMARY OF THE INVENTION

According to a first aspect of the present invention there is provided a method of limiting or reducing liquid and/or gas inflow within a passage in a matrix, such as a geological formation, comprising measuring one or more parameters relating to said matrix and selecting one or more components of a multi-component sealing composition with reference to said measured parameters and introducing said components of said sealing composition into said passage where it is set or coagulated to form a seal. The method is particularly suited to limiting or reducing water inflow within a passage.

Generally, though it is not intended to be limiting, the passage may take the form of a cavity, fault, fissure, void or pore space through which fluid or gas may travel to cause leakage, flooding and/or contamination. The present method is particularly suitable to limiting or reducing water or gas inflow in geological formations surrounding mine shafts and other similar passages, although it is not intended to be limited to such applications. The present method is equally applicable in any situation where it is desired to prevent or reduce liquid or gas inflow, such as building structures, underground excavations, waste disposal sites and foundations.

In particular, the present method includes measurement and analysis of parameters that are specific to the site that is to be treated and substantially at the time of site treatment. Preferably, the method includes measuring qualities of liquid, usually water, present within or flowing through the passage(s) to be sealed. Liquid present within the matrix is ideally collected and analysed to determine properties such as pH, temperature, mineral content and salinity. Selection and concentration of components of the sealing composition, such as additives and inhibitors are then determined with reference to these site specific measurements in order to control the set time of the composition in the passage.

In a particularly preferred embodiment of the invention, the method includes an additional step of measuring and/or analysing at least one component of the sealing composition and selecting further components with reference to said measurement or analysis of the at least one component. In particular, the method includes analysis of a latex component of the sealing composition, whereupon one or more further additives are selected on the basis of variations in the latex, particularly variations that arise primarily due to the particular season that the latex has been harvested.

Prior to, preferably immediately prior to, application of the sealing composition or grout to the site to be treated, parameters of the site specific to the matrix are measured and analysed, particularly hydraulic and/or pneumatic parameters since the water or gas flow behaviour must be evaluated if effective sealing is to be achieved. Drilling and geological sampling techniques may be employed to do this. Said parameters may, and preferably do, include in situ hydraulic conductivity testing to establish a series of baseline Lugeon values and to obtain an idea of the total aperture width of pervious features in the matrix; water take and dye testing to establish hydraulic conductivity of the passage or passages in the matrix; and presence or absence of flow conditions. These properties also provide an estimate of volume of sealing composition required for sealing. This step also includes testing of properties of water present or flowing into the passage to be treated, particularly to test parameters such as pH, temperature, mineral content and salinity, which affect selection of the sealing composition to be used. Additional site conditions are also taken into consideration, such as temperature of the ground formation in and around the site to be treated.

Once hydraulic and/or pneumatic parameters are determined, the matrix is drilled to provide injection ports through which sealing composition is directed into the matrix.

In a preferred embodiment of the present invention, the sealing composition, or grout, comprises at least one latex-based component and one or more further selected additives. It is preferred that the latex is natural latex. In a particularly preferred embodiment, the sealing composition comprises a latex emulsion or colloid and lauric acid or a laurate compound; and at least one further selected additive. The at least one further additive is selected at least partially by reference to measured parameters of the site to be treated.

However, latex based sealing composition may not be suitable for some situations. For example, in colder regions, where formation temperatures can be below $-5°$ C., a non-latex sealing composition may be selected. In particular, it is desirable to select a non-latex sealing composition if the temperature of the ground or the surrounding site will be $-12°$ C. or less. It will be noted that this method is not confined to any particular species of sealing composition.

Further additives may include coagulation or setting inhibitors to prevent setting of the composition and promote flow into and permeation of the site to be treated prior to initiation of setting within the passage. Non-limiting examples of inhibitor additives are surfactants, such as cationic surfactants. Surfactants can prevent flocculation of latex upon introduction into the passage. At sites where water present in the passage has high salt concentrations, that is, the water is substantially brine, the water in the passage can be treated with an inhibitor additive to prevent early coagulation or setting of the surface composition in the passage. A non-limiting example of such an inhibitor additive is the proprietary product KT, which contains a mixture of sodium phosphates and which when introduced to the passage as a solution, acts to prevent or slow down coagulation or setting of the sealing composition in the passage.

The further additive may also include coagulation activators to initiate or promote setting. Non-limiting examples of these additives are alkaline compounds; plasticisers, carboxylic acids, borates, silicates, hydroxides as well as metal salts thereof. Further additives include water reducers and fluidifiers.

In a particularly preferred embodiment of the invention, the method further includes measuring and analysis of parameters following an initial application of the grout and optionally, following subsequent grouting application stages. One or more components of the sealing composition are modified, if necessary, in response to changes in said parameters. For example, the sealing composition for use in any second and subsequent applications to the site is modified in response to the formation of, or change in water or gas flow paths and water or gas flow through times within the matrix. Permeability measurements allow modification or adjustment of the set time of the grout introduced to the site in subsequent applications.

In a preferred aspect, the method includes the step of introducing the sealing composition to the passage by injection. Preferably, components of the composition are introduced into the site independently such that the sealing composition is effectively composed in situ. That is, the sealing composition is a multi-component formulation wherein the various components are brought together and react therewith in situ in the passage.

Desirably, components of the sealing composition are introduced into the site by means of a suitable pump, preferably a multi-port pump, whereby the components are introduced via separate pump holes. Preferably, the pump is a displacement pump. Such pumping equipment and the ability to introduce components of the composition separately into the site advantageously enables a degree of control over introduction of the composition to the passage to be sealed and hence control of setting time within the passage. In particular, it is advantageous that the pump be able to inject the composition into the passage at variable pressures, said pressure variation selected in response to changes in measured site specific hydraulic, pneumatic and chemical parameters.

It is further preferred that the present method includes a primary sealing composition injection phase and a secondary sealing composition injection phase. It is particularly preferred that the first injection phase introduce sealing composition into a passage with the flow of water. The secondary injection phase preferably introduces sealing composition into the passage against water or gas flow, particularly once the water or gas inflow has been arrested.

The present invention therefore has, as an advantage, the ability to exercise control of set times of the sealing composition once introduced into the treatment site, allowing the composition to adequately permeate the encountered formations within the matrix a distance away from the injection point.

In some sealing applications, it may be more convenient to have the ability to introduce a single composition into a passage whilst still maintaining ability to vary or control the setting time of the composition in response to particular parameters or variables present at the site of application. In this respect, there is provided a further aspect of the present invention, which provides a method of limiting or reducing liquid or gas inflow within a passage in a matrix, such as, but not limited to, a geological formation, with a sealing composition comprising a grout component; and a grout curing agent wherein a portion of grout component is mixed with a portion of grout curing agent, the ratio of grout component to curing agent being selected with reference to one or more parameters relating to said matrix, wherein the combined grout component and curing agent are introduced into said passage where it is set or coagulated to form a seal, whereby rate of curing or setting of said grout component in said passage is controlled or varied by modifying the ratio of grout component to curing agent.

Desirably, coagulation or setting is initially delayed for a predetermined period of time. This is then followed by a relatively fast coagulation or setting of the sealing composition in situ in the matrix or passage being treated. That is, the time taken for the sealing composition to set or coagulate can be controllably delayed by modification of the ratio of grout component to curing agent to suit a specific application.

Preferably, the grout component is latex based such as a latex emulsion, colloid or aqueous dispersion. However, the grout component may also be a polymer based composition. Desirably, the grout component is aqueous to permit ready mixing with the curing agent.

The curing agent is comprised of one or more components, selected from agents capable of developing or reacting with the grout component to set or coagulate the grout component in the passage. To this effect, the curing agent desirably has a delayed setting or coagulation effect, so as to permit the combined mixture of grout component and curing agent to be pumped, injected or otherwise suitably introduced into the passage and achieve sufficient penetration within the passage to effect limitation of liquid or gas inflow.

In one embodiment of the invention, the curing agent is selected from agents that have the effect of lowering pH of the liquid. Preferably, lowering of pH occurs gradually over a period of time, the period of time being largely dependent on the ratio of grout component to curing agent. It is preferred that pH is lowered by generating acid via a reaction in-situ of the combined grout/curing agent mixture. In the case of a latex based grout component being used, oxidation of an alcohol to a carboxylic acid within an aqueous latex dispersion is one such way to lower the pH as shown in the following equation:

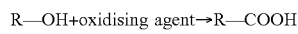

To this effect, the curing agent is in one preferred embodiment, an oxidising agent. The oxidising agent can be used to produce acids in the aqueous grout component upon addition thereto and mixing therewith. Non-limiting examples of such an oxidising agent that can be used as the curing agent are permanganate and chromium trioxide.

According to a further preferred aspect of the present invention, the curing agent is selected from a class of alcohols referred to as polyols and may be a monomeric polyol, a diol, triol, tetrol or any other polymeric polyol. Non-limiting examples are monomeric polyols such as ethylene glycol or glycerine and polymeric polyols such as polyethylene glycol. In a particularly preferred embodiment of the invention, the curing agent is a fatty acid ester of a polyol.

Testing indicates that mixing a major portion of grout component with a minor portion of curing agent results in the initial formation of a small number of coagulates or solidified particles, whilst the majority proportion of the mixture remains in a liquid form. The initially formed coagulates or particles act as an initiator or seed for formation of further coagulates or particles within the mixture which, over time, leads to coagulation or setting of substantially all of the mixture.

Advantageously, modification of the ratio of grout component to curing agent, for example by wt % has been found to enable control over the rate of setting. The grout component can therefore be combined with a predetermined quantity of curing agent, the quantity being determined largely with reference to parameters of the site or matrix to be treated, and introduced into the passage where it is set or coagulated in the passage at a rate that is optimal for that particular application.

The present invention has particular utility in application to a matrix or ground formation prior to excavation of a shaft or tunnel, such as excavated in mining operations. The present invention advantageously is able to prevent or minimise water inflow into a shaft or tunnel being constructed in a ground formation in close proximity to a body of water, such as a river or aquifer. The present invention advantageously also enables minimisation or prevention of gas inflow into the shaft or tunnel or indeed into any areas of the surrounding ground where it is not desired to permit gas to escape to.

DETAILED DESCRIPTION OF PREFERRED EMBODIMENTS

The present invention may be better understood from the following description of preferred embodiments and examples and with reference to the accompanying drawings, in which.

Figure 3:
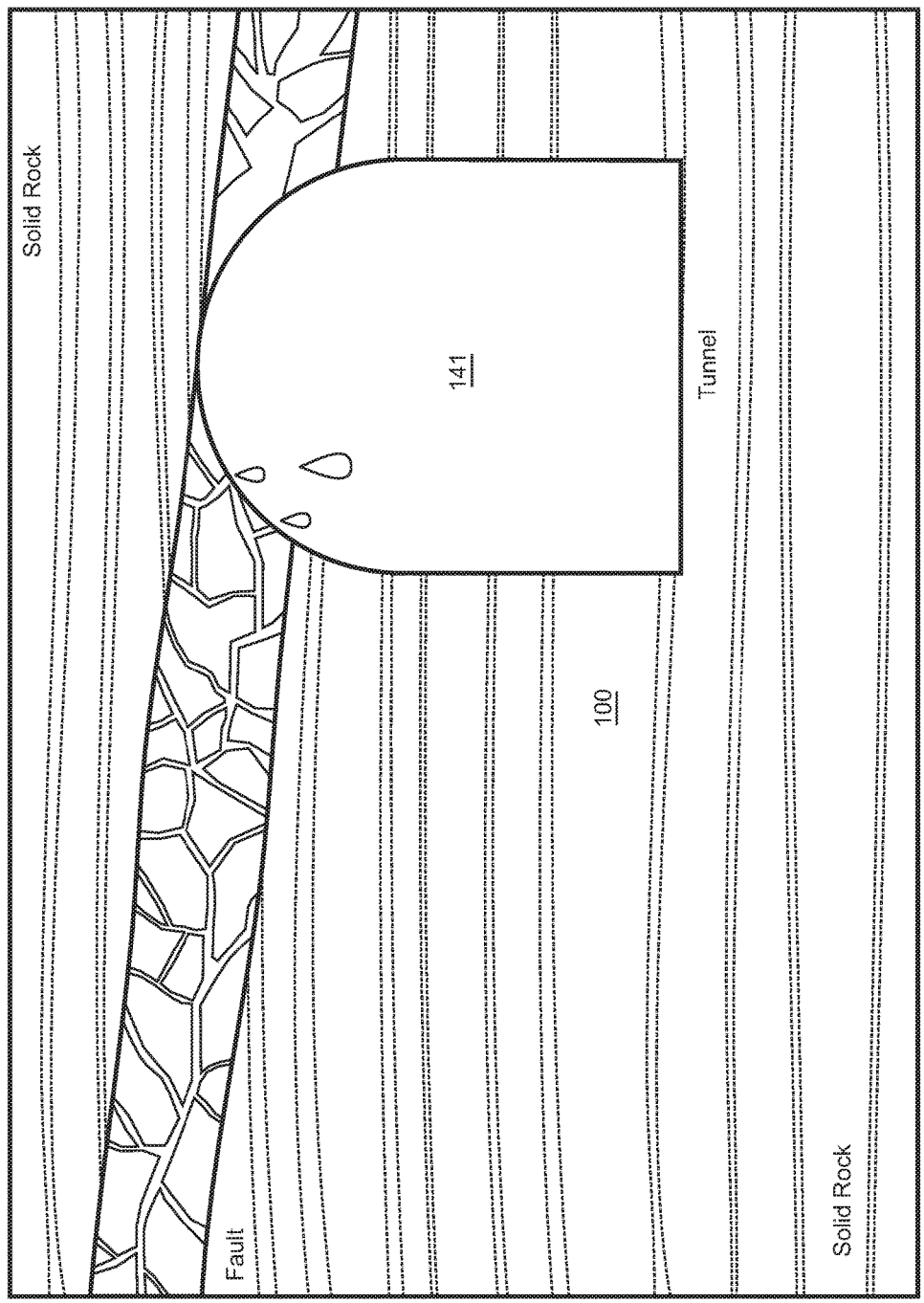
FIG. 3 is a cross-sectional view of a geological body with a mine shaft excavated therein and requiring treatment to limit water inflow, prior to any treatment.
Figure 5:
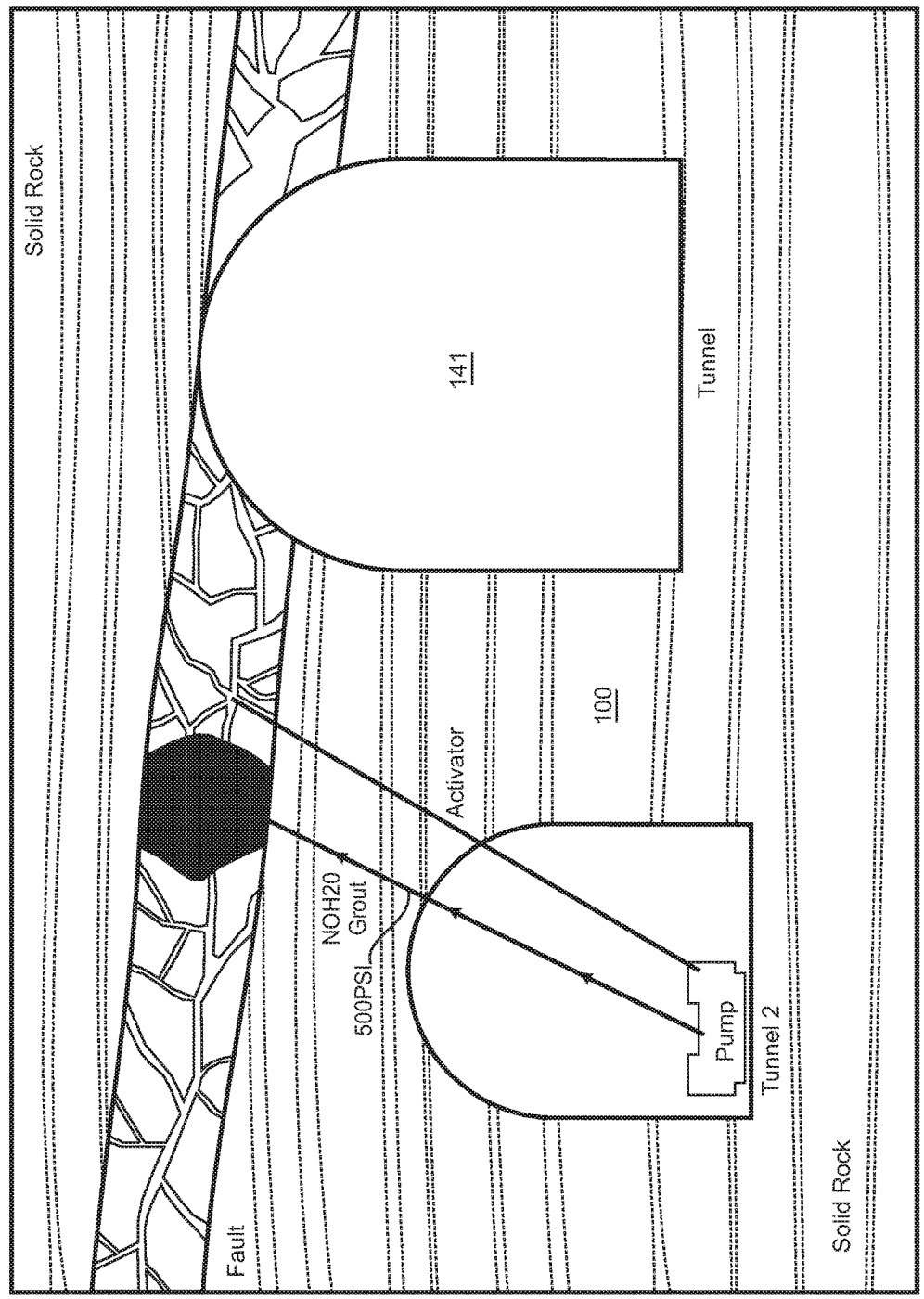
Figure 6:
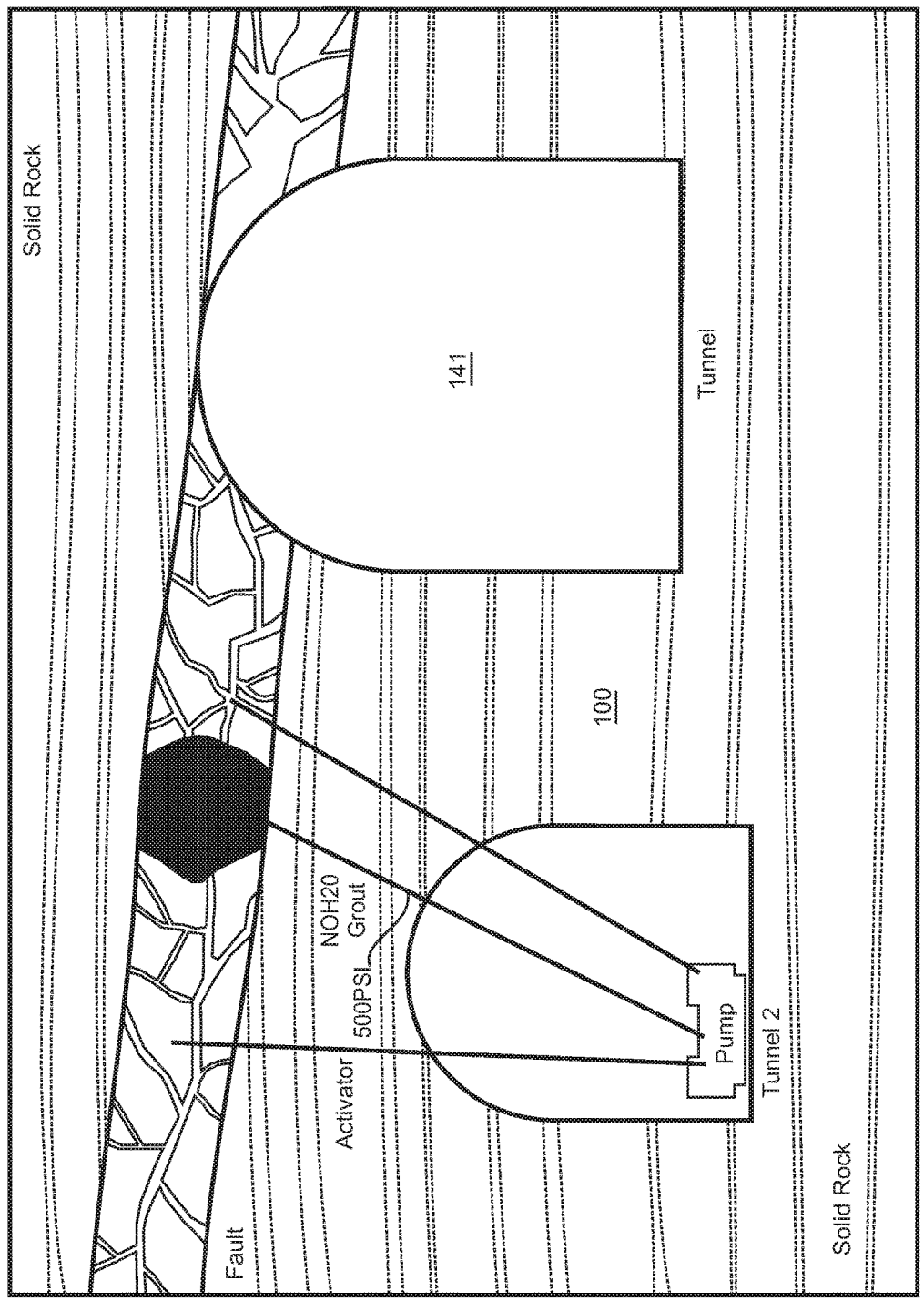

FIG. 5 is a cross-sectional view of the geological body of FIG. 3, wherein a first further additive is introduced to the passage; and FIG. 6 is a cross-sectional view of the geological body of FIG. 3, wherein a secondary injection phase of the sealing composition is undertaken The following description and examples are made primarily with reference to treatment of a geological body wherein a mineshaft is excavated, the mineshaft having cracks or apertures requiring sealing, primarily to prevent inflow of water. For example, water may be flowing or leaking into the mineshaft through passages in the form of cracks and fissures or through permeable unconsolidated matrix layers. However, the present invention is not limited to such applications and it should be understood that the present method may be successfully employed in a variety of situations where it is desired to stop or limit water inflow, such as, but not limited to, water inflows in deep and open cut mines, underground dam sealing, underground silos and bunkers, basements, underground waste depository sites, salt mines and reservoirs and dams. The present method is equally applicable where it is desired to stop or limit gas flow such as, but not limited to gas leaking inappropriately from fractures in ground created as a result of a hydrofracturing operation.

Figure 1:
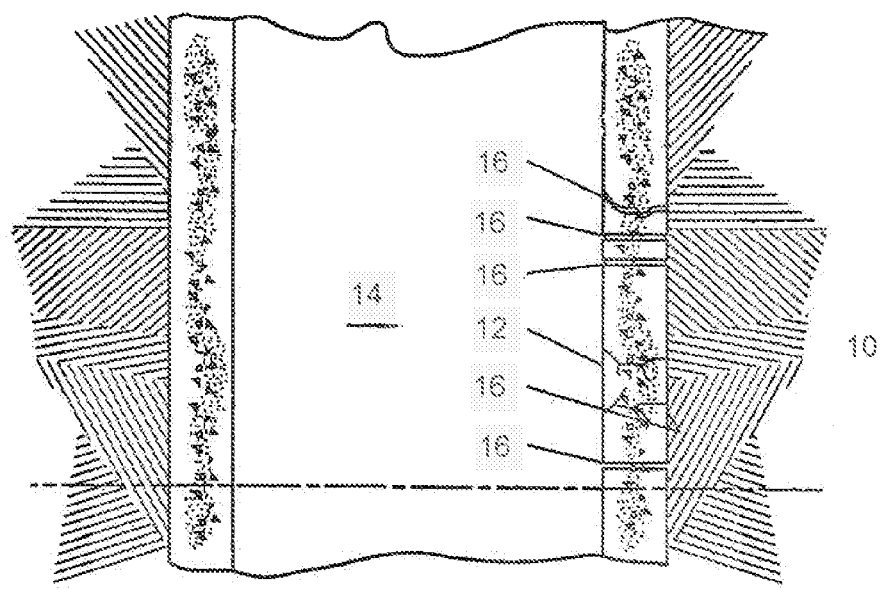
FIG. 1 is a cross-sectional view of a geological body, containing a shaft having cracks or apertures in the matrix surrounding the shaft that requires sealing to prevent or minimise water inflow into the shaft.
Figure 2:
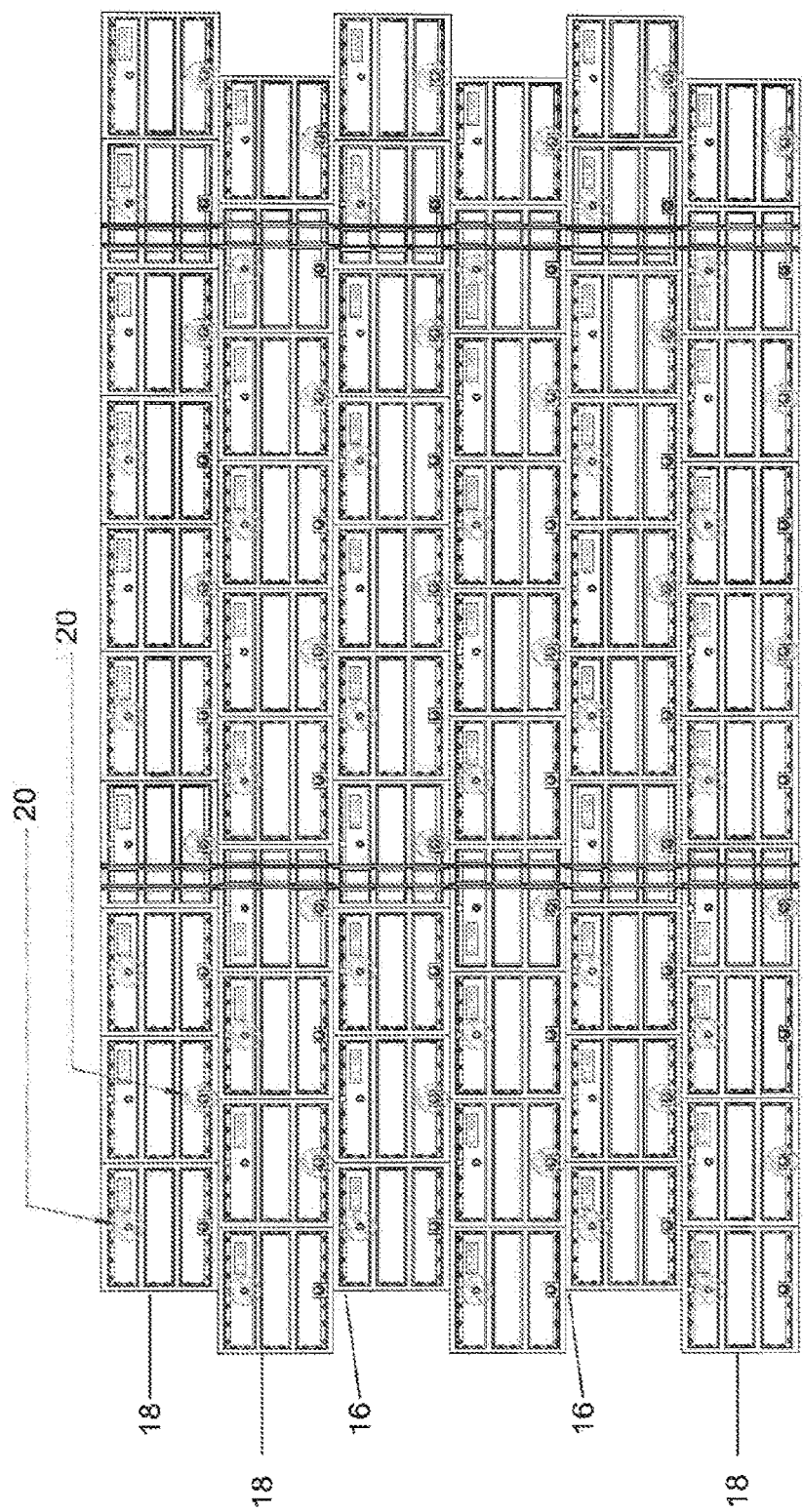
FIG. 2 is a front view of a section of a series of tubbing rings lining a shaft sunk into a matrix requiring treatment to limit water inflow into the shaft.

Referring initially to FIGS. 1 and 2, there is shown a matrix 10, being a ground formation surrounding a mine shaft 14, where water penetrates through a fissure in surrounding rock and through pore spaces in an unconsolidated sand lens. Water is able to gain entry to the shaft 14 by passing through cracks in a wall of a tubbing segment 18, through fissures 16 between respective tubbing segments 18 and through cold joints caused to form between the end of one concrete pour and the beginning of a new pour behind the tubbing segments 18, such as those depicted in FIG. 2. In the construction of the shaft 14, the tubbings 18 act as a liner to the shaft 14. In known methods of shaft construction, it is typical to freeze the ground surrounding the shaft path in order to stabilise the ground formation. In this example, the present method is advantageously applied so that ground freezing becomes unnecessary and damage caused to the rock near the shaft 14 during excavation activities can be repaired.

Injection holes 20 are drilled into the matrix and through the tubbing segments 18 at intervals around the face of the tubbing 18 inside the shaft 14. The holes can be drilled either perpendicular to the face of the tubbing 18 or at an angle, such as 45°. To reduce cost, while allowing effective sealing, the layout of injection holes 20 should minimise the number of injection holes 20 required. To this end, injection holes 20 are ideally disposed at regular and substantially equidistant intervals about the circumference of the tubbing 18. Injection ports 20 are drilled in this manner about each tubbing segment 18 lining the shaft 14. Any suitable drilling means can be used to create the injection holes, such as by using a percussive jackleg drill to drill to the required depth. Percussive drilling may be necessary in hard rock formations. Rotary drilling is more suitable and increases the permeability of the formation.

Samples of water present at the sealing site (site water) are collected from at least one area of leakage in or around the shaft 14. The water is tested to analyse chemical properties such as pH, temperature, mineral content and salinity levels. Temperature of the ground formation at and around the site is also measured.

Hydraulic parameters of the matrix 10 must also be determined. The nature and extent of the hydraulic filed must be understood if effective sealing is to be effected. In order to determine hydraulic parameters of connectivity, penetration and spread of water inflow, a suitable dye, such as a tracer dye, having same flow characteristics as water but being coloured so as to clearly contrast against the shaft 14 and the site, is introduced into each of the injection holes 20. Seepage of the dye into the shaft 14 can be timed and visually assessed to determine permeation of water inflow. Reporting of dye indicates where inflow is occurring and where main water ingress points are situated, for example at the cold joints between concrete pours. Flow rate of the dye is measured to determine flow properties of the dye within the matrix 10 when introduced at a particular rate and pressure. This gives an indication of the flow rates of a solution of the sealing composition, so that it can be determined when to introduce suitable additives and at what concentrations.

Having reference to parameters ground and water temperature, water pH, mineral content and salinity levels as well as flow properties of water in and around the site and of temperature of the site, components and the respective concentrations of said components of the sealing composition can be suitably selected.

At sites where the temperature of the immediate and surrounding ground formation is less than about −12° C., or over 100° C., the components of the sealing composition must be selected accordingly. For example, a cement based sealing composition can be selected preferentially over a latex-based sealing composition if the ground temperature is too high. It is also possible to use a combination of two different types of sealing composition. For example, a cement-based sealing composition can be used to bulk fill large voids and a latex-based sealing composition can subsequently be used to fill smaller cracks and fissures.

Referring to the geotechnical assessment of the ground formation, particularly water permeability, standard cement or microfine (particles <30 micron) is used. For example, if the size of the passage or apertures in the formation is generally wider than 160 micron, the site can be treated with a standard cement composition. Apertures that are smaller and which cause slow seepage, require a microparticle material. Additives and admixtures are added to the cement based composition to obtain desired rheology and set characteristics, having reference to the measured parameters of the site.

At a site where the temperature of the immediate and surrounding ground formation is −12° C. or greater, and water inflow permeation testing indicates that there is presence of water flow conditions, it is desirable to use a multi-component latex based chemical composition, such as that described in Australian patent number 739427, the contents of which are hereby incorporated by reference.

Such a chemical composition ideally has as a significant or bulk component, a latex emulsion or colloid, preferably at <30% of the total composition. Typically, the latex is provided in emulsion or colloidal suspension with water. It is preferred that the latex is a natural latex, as natural latex has surprisingly been found to exhibit better sealing capabilities than synthetic variations. Concentration of latex in water may be selected having reference to the chemical and hydraulic parameters determined in earlier steps of the method.

Having reference to the aforementioned measured hydraulic parameters and chemical properties of the water and the site, one or more further additives are selected for combination with the latex emulsion for delivery to the passage to be treated. As the sealing composition is introduced into the water flowing through the passage or passages requiring sealing and the sealing composition is carried through the passage by the water, the water effectively becomes an ingredient in the sealing composition once it is introduced into the passage. The one or more further additives are therefore added to complement the chemistry of the water or to remedy chemical characteristics that can have an undesirable effect on the sealing composition once introduced into the passage At sites having acidic water present within the passage, setting or coagulation of the sealing composition may be prematurely induced upon introduction of the composition into the passage, whereupon the composition is unable to adequately permeate the matrix 10. If water analysis indicates a pH of value less than 7, it is desirable to add an inhibitor component to alter the pH to an alkaline condition. Such inhibitors are provided in alkaline solution generally above pH 10 or 11, so as to increase the pH of the water. These can include, for example, the kind found in detergents and soap like substances, non-limiting examples of which are tripolyphosphate, the proprietary product KT (in powder or solubilised), which contains a mixture of sodium phosphates, or an alkaline potassium hydroxide (KOH). In treating a site that is acidic or slightly acidic, the inhibitor additive is injected or pumped into the passage and is combined with the latex component in situ within the passage. The degree of alkalinity of the inhibitor additive is determined with reference to the pH measurement of the water.

At sites where the water is particularly acidic, it is advantageous to first flush the passage with either a pH-neutral or alkaline solution, such as the proprietary product named C4 (product code XTMC4136), which is a surfactant blend of surface acting agents, prior to introduction of any latex component so as to increase the pH of the water and thereby avoid premature setting within the passage. The introduction of such a component into the passage also permits the sealing composition to be pumped into the passage at a reduced pressure, since the introduction of this solution enhances the penetrability of the sealing composition in the passage irrespective of whether the matrix 10 is predominantly a rock or soil formation.

Conversely, it can be useful to acid flush the permeable features intersected by the injection holes 20 to displace the ground water therein. The flushing action assists to enhance the permeability of the ground formation and permits better penetration of the sealing composition once introduced. It is typical to use a weak acid based stabiliser solution for this flushing purpose. However, other types of dilute acids can also be used, a non-limiting example of which is hydrochloric acid (HCl). Introduction of an acid solution can advantageously open or re-open permeability of the formation of the matrix 10, effectively dissolving deposits of material that can otherwise impede travel of the sealing composition within the permeable features of the matrix 10.

At sites having water containing high salt content, such as may be experienced when sinking a shaft in a body of salt, premature setting or coagulation of the composition within the passages can also be experienced. Where water conductivity measurements indicate high salinity, it is desirable to introduce one or more inhibitor additives, such as those described above, that act to inhibit setting or coagulation of the sealing composition within the passage. Alternatively or in addition, it can be advantageous to first treat the water within the passage to reduce salinity prior to introduction of the latex component. That is, the passage is flushed so as to displace the ground water immediately prior to introduction of the composition.

Prior to introduction of the customised sealing composition, containing components selected with reference to the properties of the matrix 10, each injection hole 20 is water tested to establish a series of base line Lugeon values and obtain an idea of the total aperture width of the permeable features in the treatment site. This testing also provides an indication of the volumes of sealing composition likely to be required to seal these features so as to effectively seal them and prevent fluid ingress and leakage into the shaft 14.

During initial phases of introduction of the multi-component composition into the passage, the composition is formulated to provide an extended set time so as to allow for optimum spread and penetration of sealing composition into the formation. It is undesirable for the sealing composition to set too close to the injection port 20 as this then requires drilling of further injection holes 20 in order to enable introduction of additional composition. Ideally, introduction of the sealing composition creates a lateral grout spread over a distance which is more or less equal to the distance between the injection hole 20 and the liner of the shaft 14, in this case the tubbing 16. At the very least, grout spread should be sufficient to form overlapping grout cylinders around the shaft 14.

As introduction of the sealing composition into the passage, or network of passages progresses, the set time is gradually reduced by addition of more activator additive. This enables grout spread to be limited to within the target area, being the minimum area of the matrix 10 that requires application of the sealing composition to minimise or limit water inflow, thereby minimising waste of sealing composition and unnecessary distribution within the matrix of the ground formation.

As the grouting operation proceeds, the set sealing composition will block and fill open parts of the matrix, leading to a change in water flow paths and flow-through times. It is therefore required that adjustments to the sealing composition set time be made in response to these changes. It is desirable then, that further measurements of hydraulic parameters of the matrix 10 and chemical properties of the water be made as the sealing composition is applied to the passage and modifications to the overall composition be made with reference to these measurements. If the apparent Lugeon value is not shown to decrease over time, it means that the sealing composition is continuing to fill voids in the matrix. Based on volume of sealing composition already injected, set times of the sealing composition can be gradually reduced by, for example, adding greater quantities of activator additive or the same volume at a greater concentration. If the apparent Lugeon value shows decrease over time, it is indicative that the sealing composition is in a permeation mode. The sealing composition can therefore continue to be introduced into the passage with no changes being made to set time. However, if measurements indicate that the apparent Lugeon value is decreasing at a rapid rate, adjustments are made to the individual components of the sealing composition to extend the setting time within the passage.

Injection of the sealing composition commences at the lowermost tubbing segment 18 within the shaft 14 and progressively moves upwards. Sealing composition is injected into a first injection hole 20 until such time as the sealing composition is observed in next injection hole 20 in that tubbing segment 18. Sealing composition is introduced into the second injection hole 20 and each subsequent injection hole 20 until the entire circumference is treated. Injection of the sealing composition then moves upwardly to the next tubbing ring 18. However, the sealing composition can be injected into injection holes 20 in any particular order, so long as the sealing composition is able to fill the void between the outer circumference of the tubbing rings 18 and the surrounding ground.

With reference to the measured site hydraulic parameters and chemical properties of the water, sealing composition in the present example is injected into the passage with minimal pressure. It is desirable to maintain a low injection pressure so as to avoid any issue of hydro-fracturing of the surrounding matrix. In this application, the injection pressure desirably should not exceed 1.25 to 2.5 times the hydrostatic head. Ideally the injection pressure is determined based on rock mechanics of the matrix at the site and with reference to the depth of the injection holes 20.

Advantageously, inhibitor additive is introduced into the passage by means of a multi-port displacement pump. The multiport nature of the pump enables introduction of the individual components of the sealing composition so that they effectively only react with each other in situ within the passage. Injection of the components of the sealing composition is desirably increased from hydrostatic head to maximum pressure slowly and gradually. Typically, as water within the passage is sealed off, the pressure will increase automatically. If necessary and particularly in order to avoid hydro-fracture of the surrounding ground formation, injection pressures are adjusted to suit the requirements of the specific site and with reference to measured parameters specific to the site, including the distance from the injection hole 20 it is desired to distribute the sealing composition.

Where the latex emulsion component is used, the sealing composition is injected into the water flowing or present in the passage via the various injection holes 20. As the latex component flows within the passage, it is activated at least partially by agitation, causing the sealing composition to coagulate to form a seal within the passage or network of passages. If measured flow conditions dictate, for example flow velocity is high, say 200 L per second, a chemical activator component is added to increase the rate of coagulation and setting within the passage.

Following an initial treatment phase where sealing composition is introduced into the site and setting initiated and completed, it is highly desirable that at least a second treatment phase be conducted. It has been found that following treatment of a site with sealing composition, water often recharges from local aquifers and finds a new route, being a path of least resistance, into the shaft 14. Due to the disturbed flow path of the water, new leaks into the shaft 14 can occur and these must be dealt with accordingly. Steps as described above, being drilling of injection holes, analysis of site matrix with a suitable dye to assess permeation of water inflow and chemical analysis of site water are carried out. Having reference to these measured parameters, species of components and their concentrations are selected and introduced into the passage substantially as described above.

Referring now to FIG. 3, there is shown a ground formation 100 wherein a tunnel 141, such as a mine shaft, has been excavated underneath a body of water, such as an aquifer, flowing through the matrix 10 of the ground formation 100. Water inflow into the tunnel 141 must be stopped or limited so that the tunnel 141 does not flood. In this example, the tunnel 141 is an open formation, having no lining between the tunnel interior and the surrounding matrix 10, composed predominantly of rocks and unconsolidated formations including loose rocks. This type of formation is susceptible to threat of hydro-fracturing and potentially dangerous rockfalls or mudslides.

As with the previous example, water take and dye tests are conducted to establish hydraulic conductivity of fissures within the matrix and contributing to water inflow into the shaft. It has been found, in unconsolidated geological formations, that hydraulic fracturing can be a significant problem. Once open parts of water inflow fissures become plugged with set or coagulated sealing composition, the inflow will eventually become aperture limited, whereupon water velocity will increase and result in additional scouring within the matrix. This can also occur after a site has been successfully treated with the sealing composition. For this reason, it is desirable for the method to include a primary injection phase (see FIGS. 4 and 5), where the sealing composition is introduced into the passage with the flow of water or gas via injection hole 201; and a secondary phase, where the sealing composition is introduced against the water flow once the inflow into the tunnel 141 has seized (see FIG. 6). The two-phase application advantageously serves to create an impermeable curtain of sealing composition.

As with the previous example, an in situ hydraulic conductivity test is conducted prior to introduction of any sealing composition into the passage. This establishes a series of baseline Lugeon values and provides an indication of total aperture width of pervious features within the matrix. Similarly, water in the site is tested for pH, temperature, mineral content and salinity levels.

Figure 4:
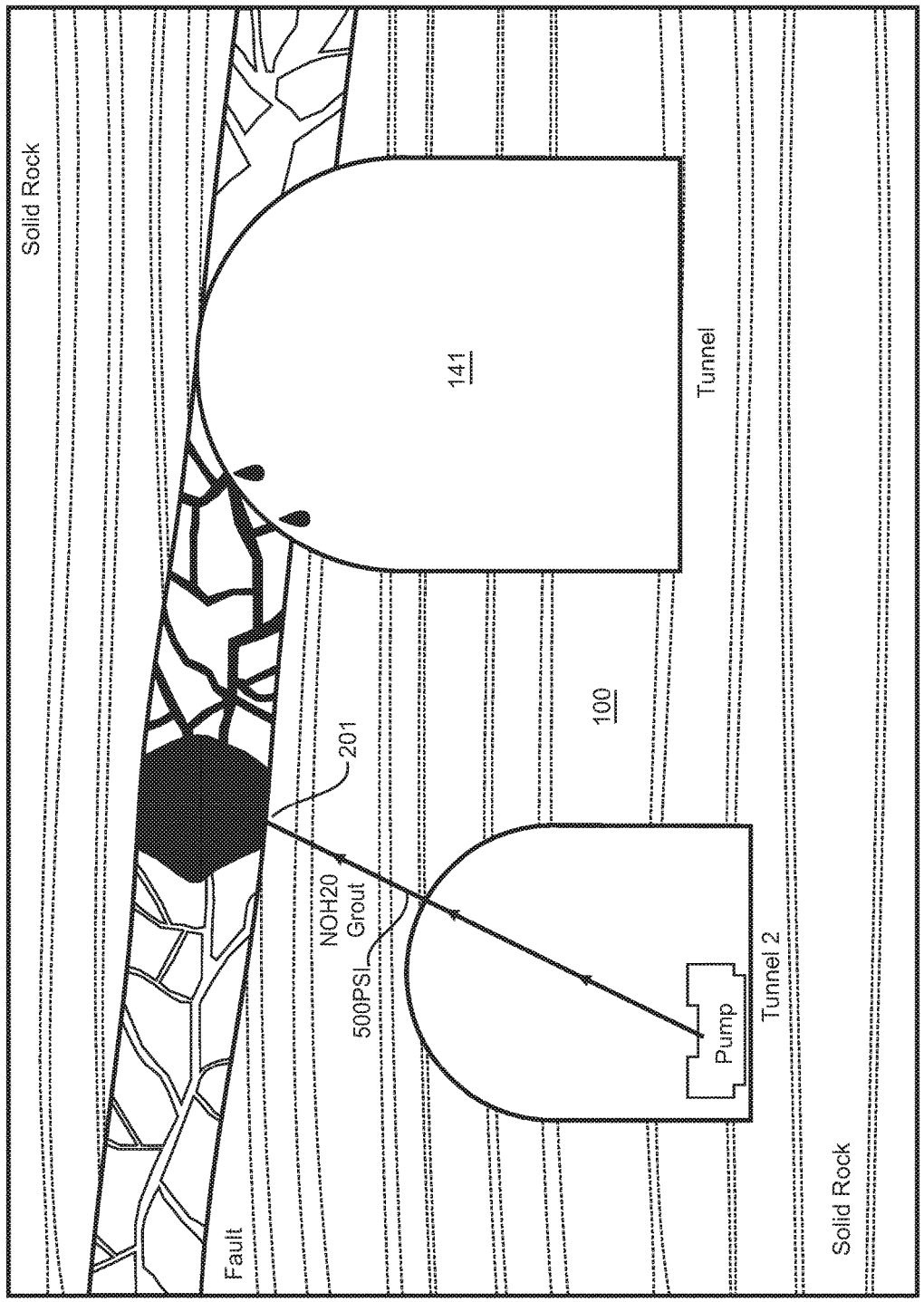
FIG. 4 is a cross-sectional view of the geological body of FIG. 3 being treated to limit water inflow into the mine shaft in accordance with the present invention.

During injection of the sealing composition, it is advantageous to reduce set times of the sealing composition in the passage as injection continues so as to prevent setting or coagulation of the sealing composition too close to the injection holes 201 and to achieve a lateral spread of sealing composition that is sufficient to create an effective barrier to prevent water inflow into an excavation. At the commencement of injection, the multiple components of the composition are introduced and initially permitted to flow through and leak into the tunnel 141 (FIG. 4). This permits measurement of an initial flow through time or resident time.

It is the aim of the present method to attain a lateral spread of the sealing composition which is substantially the distance between the injection hole 201 and the perimeter of the pervious feature. It is also important to ensure that the sealing composition does not set too close to the injection hole 201 as this will then require drilling of additional holes and hence undesirable additional cost.

Setting time of the sealing composition is gradually reduced by introduction of greater quantities or greater strength of a suitable activator additive (FIG. 5), the type and composition of which is selected, as above described, with reference to the measured parameters specific to the site. Set time is reduced to the point where the sealing composition no longer washes out of the pervious features of the matrix 100, but is rather bound within the matrix 100 to form a seal.

Optionally, activator component can be introduced into the water flow via a separate injection hole 201 to one or more other components of the sealing composition. For example, referring to FIG. 5, in the instance where a latex-based sealing composition is employed, the latex component is introduced to the water flow via first injection hole 201a and activator component is introduced via second injection hole 201b. Injection hole 201b intersects the passage downstream from injection hole 201a. In such a case, latex component is pumped into the water flow within the void or passage via injection hole 201a, where it is carried towards the tunnel 141 by the water flow within the passage. Activator component is introduced into the passage via injection hole 201b where it is mixed with latex component flowing downstream. The mixed sealing composition is then set or coagulated so as to form a seal, preventing further water inflow into tunnel 141.

As indicated, it is desirable that a secondary injection or sealing phase be undertaken, this phase being introduced against the water flow, as shown in FIG. 6. If it is observed that during the secondary injection phase, there is no further pressure build up at a given flow rate, it is indicative that the set composition is being pushed back too far into the matrix and the sealing composition is penetrating too far away from the target site, leading only to wastage of material. If this is the case, set time of the sealing composition should be gradually reduced by reduction in activator additive and/or increase in inhibitor additive into the matrix. For example, the pH of the composition in the matrix is transitioned from an acidic pH to a more alkaline pH.

Referring to FIG. 6, the secondary injection phase can be undertaken by optionally drilling a further injection hole 201c, which intersects the passage upstream of the passage (now sealed with sealing composition). The latex component of the sealing composition is pumped via injection hole 201a and is forced upstream within the passage since the downstream part has been sealed with sealing composition. Activator component is pumped into the passage via injection hole 201c where it is mixed with the latex component and the sealing composition is caused to set. The primary injection phase, introducing and setting sealing composition downstream within the passage is therefore a reactive application of the sealing composition, to remedy water inflow into the tunnel 141. Application of the sealing composition via the secondary phase, where it is introduced upstream and against water flow, is proactive treatment, where water scouring and hydrofracturing of the matrix 100 is prevented.

The present invention is also particularly useful in proactive treatment of a formation prior to excavation, having the benefit that it is not necessary to have to deal with water inflows into the excavated mine shaft during mining. The following example of application of the present method relates to a pre-excavation application to prevent water inflow into a shaft being constructed in a ground formation in close proximity to a large body of water, such as a river. In this example, the ground formation can often contain significant quantities of fractured sandstone and unconsolidated sand layers.

To obtain relevant geotechnical information regarding the site, a pilot hole is drilled within proximity of the planned shaft. Obtaining samples in this manner permits at least identification of the geological properties of the ground formation. In the event that the ground formation is found to consist mainly of sandstone and unconsolidated sandstone, the properties of both types of matrix need to be accounted for when selecting the components of the sealing composition.

To accommodate the possibility of vertical or sub-vertical fissures and/or saturated sand lenses being encountered during the mine shaft excavation, the sealing composition, once applied, should construct a curtain around the proposed path of the shaft in order to reduce permeability of the surrounding formation and minimise water inflow into the future shaft. A series of primary injection holes, preferably spaced equidistant around the proposed shaft perimeter, are drilled. Desirably, the primary injection holes are drilled offset from the outside edge of the proposed shaft. Typically, about eight of these primary injection holes are drilled about the perimeter. It is desirable for a further number of secondary injection holes to be drilled to measure effectiveness of the application of the sealing composition during and after first application. The secondary injection holes are located substantially at a mid-point between the primary injection holes. Each injection hole is drilled to a required depth, dictated by the proposed depth of the shaft. Each injection hole is also drilled so as to be able to accommodate the insertion of a packer to enable pressure grouting at various stages of the application. Any suitable packer can be employed for this purpose. For example, a single, open ended inflatable packer can be suitable or a double filament packer.

Prior to selection of components and introduction of the sealing composition into the passage, each injection hole is water tested to establish a series of base line Lugeon permeability values and to obtain an idea of the total aperture width of the pervious features in the ground formation. Similarly, water within injection holes is sampled and analysed to test parameters such as pH, salinity, mineral content and temperature.

Following water testing activities, the injection holes and the pervious features intersected thereby can be flushed with a fluid, selected with reference to measured chemical properties of the ground water as described above, so as to displace the ground water. Depending on conditions of the site, particularly pH of the water, it may be desirable to flush with a slightly acidic solution. The flushing action advantageously acts to enhance the permeability of the ground formation by altering the chemical conditions therein to suit the sealing composition, which assists in the formation of an appropriate curtain of set sealing composition. Optionally, and with reference to the measured parameters of the site, a stabilising additive, being a surfactant blend of surface acting agents, such as detergent, is introduced into the matrix via the injection holes so as to enhance penetrability of the sealing composition by essentially acting as a lubricant within the passage.

Selection of types and concentrations of the sealing composition is made with reference to measured parameters of the site and the water flowing therein, substantially as described above in relation to earlier examples. As described above, once injection of the sealing composition into the passage is commenced, careful and continuous assessment is required, to monitor, for example, changes in Lugeon permeability values and then to modify composition set time by modification of additives, substantially as described above. Response times to adjustments in the make-up of the sealing composition are likely to be considerable in an application such as this, as the depth of the injection holes and of the passages being sealed is likely to be very deep. It is important then, for changes to the composition to be gradual so as to avoid shot-gun refusals (premature setting of the sealing composition before it has been permitted to spread sufficiently) and loss of access to the pervious target zone.

It is also desirable to modify the pressure at which components of the composition are introduced into the passage with reference to the measured parameters relating to the site. In the present instance, the mechanics, e.g. rock mechanics of the matrix will largely determine the suitable pressure to enable adequate penetration of the sealing composition in the matrix without causing damage such as hydrofracturing.

Having regard to measured parameters of the site and the water flowing therein, measured before, during and/or after any treatment of the site to prevent or minimise water inflow substantially as described above, it may be desirable or more convenient to treat the site by introduction of a single composition into the passage to be treated. In such an instance, it is still required to have the ability to vary or control setting time of the composition, particularly in response to measured parameters or variables of or at the site. In such circumstances, an alternative embodiment of the present invention may be more suitable or convenient.

In this embodiment, the sealing composition is comprised of at least a grout component and a curing agent. A major portion of grout component is mixed with a minor portion of curing agent prior to introducing the combination to the passage requiring sealing. That is, the combined grout component and curing agent are introduced into the passage where it is set or coagulated to form a seal. Advantageously and conveniently, the rate of or overall time taken for setting or coagulation of the combination in the passage can be controlled or varied by modifying the ratio of grout component mixed with curing agent.

The grout component can be either latex based, such as a latex emulsion, colloid or aqueous dispersion; or can be a polymer based grout composition. In either case, the grout component is substantially aqueous, firstly to enable ready mixing with the curing agent and also to facilitate fluid movement of the combined grout/curing agent into and through the passage to be treated.

The curing agent is selectable with reference to parameters of the site and to the specific constitution of the grout component. The curing agent is a composition or chemical that is capable of developing or reacting with the grout to set or coagulate the grout component in the passage in a manner whereby setting or coagulation is initially delayed. This permits the combined liquid mixture of grout and curing agent to be pumped, injected or otherwise introduced into the passage (such as has already been described above) whilst achieving sufficient penetration within the matrix or passage to effect limitation of liquid inflow. That is, the mixed grout/curing agent must remain in a liquid form sufficiently long enough to reach those regions of the matrix or passage. The exact period of time required for the mixture to remain liquid is dependent on measured site parameters, such as has been discussed above. The degree of penetration of the sealing composition in the matrix or passage is also a determining factor in deciding how long the mixture is to remain in a liquid state and this in turn can be deciding factor in selection of the curing agent for any particular application. Ideally, curing or setting is initially delayed and is then followed, after a predetermined period of time, with a relatively fast setting of the sealing composition within the passage.

Particularly if the grout component is a latex based composition, the curing agent is desirably selected from agents that have the effect of lowering the pH of the liquid gradually over a period of time to a pH that effects complete setting or coagulation of the grout component. In the case of a latex based composition, this is typically a pH of about 3. The pH is lowered gradually by virtue of generation of acid in-situ of the combined grout/curing agent mixture.

One such way of lowering the pH over time is by use of oxidising agent as the curing agent. The oxidising agent can be used to produce acids in situ in the aqueous grout component. Non-limiting examples of suitable oxidising agent for use as the curing agent are permanganate and chromium trioxide.

This embodiment of the present invention can be further described with reference to the following non-limiting examples:

Example 1: Potassium Permanganate and Ethanol as Curing Agent

In this example, an equal mass of potassium permanganate solution (40 g/L) and ethanol (combination acting as the curing agent) was combined with moderately saline water (synthesised to have characteristics of water present in many geological formations requiring treatment for prevention of water inflow). This combined liquid was added to 60% of a latex based grout composition (sold under the proprietary trade name NOH2O). Proportion of curing agent to grout component was modified to effect variation in rate of coagulation/setting of the sealing composition. The results are shown in Table 1.

TABLE 1

Setting/coagulation of latex based grout composition with curing agent (potassium permanganate solution and ethanol)

| Saline water | Wt % in curing agent | | Time since mixing to achieve solid mass |
|---|---|---|---|
| | $KMnO_4$ solution | EtOH | |
| 96 | 2.0 | 2.0 | Some solid after 20 mins; mostly solid after 16 hours |
| 92 | 4.0 | 4.0 | Some solid after 20 mins; mostly solid after 16 hours |
| 92 | 8.0 | none | Partly solid after 30 mins; soft solid after 10 days |
| 92 (non-saline water) | 8.0 | none | Thick liquid after 10 days |

The combination of potassium permanganate solution and ethanol as a curing agent can be used to set or coagulate grout component by reacting with the grout component and lowering the pH of the grout component dispersion. A soft solid coagulate resulted from adding this curing agent to the grout component approximately 30 minutes after mixing.

Example 2: Potassium Permanganate and Alcohol as Curing Agent with 60% Latex Based Grout Composition A combination of potassium permanganate and alcohol was used to coagulate or set a 60% latex based grout component (sold under the proprietary name NOH2O). Rate of coagulation was altered by using a different alcohol to ethanol in combination with the permanganate solution. For example, it was postulated that adding an alcohol with more than one hydroxyl (OH) group instead of ethanol could alter the coagulation delay time or increase the rigidity of the grout once set. To test this, several different liquid polyols were combined with permanganate solution and then added to and mixed with 60% latex based grout component. The results of this testing are shown in Table 2. Best overall coagulation in the proportions tested was achieved using ethylene glycol in combination with permanganate solution.

TABLE 2

Coagulation of 60% latex based grout component with potassium permanganate solution and various alcohols

| 60% grout wt % in mix | wt % KMnO$_4$ solution | Curing agent components Alcohol type (2.0 wt % of mix) | Time since mixing to achieve solid mass (mins) |
|---|---|---|---|
| 92.0 | 6.0 | Ethanol | 30 (soft) |
| 92.0 | 6.0 | Polyethylene glycol | 60 (soft) |
| 92.0 | 6.0 | Ethylene glycol | 60 (paste) |
| 92.0 | 6.0 | Polyvinyl acetate | 5 (soft) |
| 92.0 | 6.0 | 50% ethanol/ ethylene glycol | 30 (soft); firmer solid after 10 days |
| 92.0 | 6.0 | 50% ethanol/ polyol mix | 5 (soft) |

Example 3: Potassium Permanganate as Curing Agent with 60% Latex Based Grout Component A range of proportions of 40 g/L permanganate solution as curing agent, in proportions from 1 wt % to 8 wt % was added to 60% latex based grout component (sold under proprietary name NOH2O) and progress of setting/coagulation monitored for up to 10 days. The results, shown in Table 3, indicate that between 4 and 8 wt % of permanganate solution was needed to produce a soft solid on mixing with 60% grout component.

TABLE 3

Coagulation of 60% latex based grout component with potassium permanganate solution as curing agent

| 60% grout Mass (g) | wt % in mix | Curing agent Wt % KMnO$_4$ solution | Time since mixing to achieve solid mass (mins) | Description 10 days after mixing |
|---|---|---|---|---|
| 24.75 | 99.0 | 1.0 | N/A | Slightly thick liquid |
| 24.50 | 98.0 | 2.0 | N/A | Thick liquid |
| 24.00 | 96.0 | 4.0 | 2.0 | Soft solid - paste |
| 23.00 | 92.0 | 8.0 | 2.0 | Soft solid |

Oxidation of organic hydroxyl groups by the permanganate ion KMnO$_4^-$ is catalysed by the presence of either acid or base. The dispersion of latex based grout component used in this example is stabilised by ammonia solution and therefor alkaline, the hydroxide concentration is important in the rate of oxidation by permanganate. To slow the rate of coagulation, a small amount of acid can be added to the dispersion of grout component to reduce the amount of free hydroxide. This too can be used to control or vary the delay of coagulation or setting of the combined grout component and curing agent. Achieving longer delays in setting or coagulation can increase the capability of the sealing composition to penetrate the passage or pores of a matrix and then set therewithin.

Example 4: Varying Ratio of Polyol Curing Agent to Grout Component and Effect on Coagulation/Setting Time A trial was conducted to test the effect of varying ratio of a polyol curing agent to grout component on setting time of the combined grout/curing agent mixture. In these tests, polyol curing agent was dropped slowly under stirring into a quantity of grout component (sold under the proprietary name of NOH2O). Depending on the amount of added polyol curing agent, complete setting of the grout component was effected between 7 and 48 hours. Water is released depending on the amount of added curing agent. The higher the volume of curing agent added, the higher the amount of released water. Results of these tests using different ratios of curing agent to grout component are shown in Table 4

TABLE 4

Setting time and free fluid of grout component with varying ratios of polyol curing agent

| Polyol curing agent (%) | Mass of grout component (g) | Mass of polyol curing agent | Setting time | Free fluid (ml) |
|---|---|---|---|---|
| 1 | 49.5 | 0.5 | >4 weeks | — |
| 2 | 49 | 1.0 | >4 weeks | — |
| 3 | 48.5 | 1.5 | 24-72 h | 0 |
| 5 | 47.5 | 2.5 | 11-12 h | 4.7 |
| 8 | 46 | 4.0 | ~11 h | 11.8 |
| 10 | 45 | 5.0 | ~5 h | 12.5 |
| 14 | 43 | 7.0 | ~2 h | 10.5 |

Mixing of the grout component with varying volumes (ratio) of polyol curing agent results in spontaneous formation of a small number of small coagulates or solid particles within the mixture. At the time of initial mixing, the majority of the grout remains as a liquid.

Example 5: Penetration of Combined Grout Component and Polyol Curing Agent in Sand of Varying Grain Sizes Penetration tests were carried out in tubes, each filled with a different type of sand, characterised by different particle size distributions. Grout component (sold under proprietary name NOH20) was mixed with 4% polyol curing agent and introduced into tubes containing sand of different grain sizes. The combined grout/polyol curing agent mixture was introduced into each of the tubes. Results of penetration of the combined grout/polyol curing agent in small tubes is shown in Table 5.

TABLE 5

Penetration tests of grout component with polyol curing agent in small tubes

| Max grain size of sand (mm) | Height of sand (cm) | Height of unfilled material (pressure head) (cm) | Max penetration depth (cm) |
|---|---|---|---|
| <0.4 | 9.2 | 8.5 | 1.5 |
| 0.4-0.63 | 10.0 | 8.0 | 10 |
| 0.63-1.0 | 8.0 | 8.0 | 8.0 |
| 1.0-1.63 | 9.5 | 8.5 | 9.5 |
| Sand from Baltic sea | 9.2 | 8.5 | 6.0 |

It will be seen that only the very fine sand particles (<0.4 mm) and the sea sand was not penetrated completely. In all other cases, pore space between grains of sand were filled up with the combined grout/curing agent mixture and sealed.

In use of this alternative embodiment of the present invention in application, for example, in preventing or limiting water inflow in a geological formation, the sealing composition comprising at least grout component and curing agent can be pre-mixed at a time before the sealing composition is required for use. Since setting or coagulation time can be controllably delayed for a particular period of time by appropriate variation of ratio of grout component to curing agent, the grout component can be mixed with an appropriate quantity of curing agent prior to transport to the site requiring treatment by the sealing composition. Setting time can be appropriately delayed to take into account time required for transportation to site, time taken to introduce the sealing composition into the passage or matrix and time required for the sealing composition to adequately penetrate the matrix or passage.

Once the mixed grout component/curing agent has arrived at the site, it can be introduced into the matrix or passage by suitable means, such as by injection or pumping into pre-drilled injection holes, substantially as described above. Manipulation of the delay in setting time of the sealing composition by varying ratio of grout component to curing agent at the time of mixing enables the sealing composition to be introduced into the matrix or passage and penetrate sufficiently so as to effect limitation of liquid inflow as required.

Modifications and variations as would be apparent to the skilled addressee are deemed to be within the scope of this invention.

The invention claimed is:
1. A method of limiting or reducing permeability of a matrix to limit or reduce liquid or gas inflow within a passage in the matrix, the method comprising:
   measuring and analyzing one or more parameters relating to said matrix, wherein at least one parameter is selected from hydraulic and/or pneumatic parameters including Lugeon values;
   selecting one or more components and a concentration of the one or more components, of a multi-component sealing composition with reference to said measured parameters; and
   introducing said selected components of said sealing composition into said passage where it is set or coagulated to form a seal,
   whereby setting or coagulation time of the sealing composition is varied or controlled by said selection of the one or more components and the concentration of the one or more components in the following manner:
   establishing a baseline set of Lugeon values; and
   when an apparent Lugeon value remains the same or increases over time, said setting or coagulation time of said sealing composition is reduced; or
   when said apparent Lugeon value decreases over time, said sealing composition is introduced into the passage with no changes being made to said setting or coagulation time.
2. The method according to claim 1, wherein the selected components of the sealing composition are introduced into the passage by a primary injection phase and a subsequent secondary injection phase.
3. The method according to claim 2 wherein the primary injection phase introduces sealing composition into the passage with the flow of liquid or gas in the passage.
4. The method according to claim 3, wherein the secondary injection phase introduces sealing composition into the passage against the flow of liquid or gas.
5. The method according to claim 1, wherein the selected components of the sealing composition are introduced into the passage and react together in situ in the passage.
6. The method according to claim 5, wherein the selected components of the sealing composition are introduced into the passage via separate injection holes.
7. The method according to claim 1, wherein the sealing composition includes a latex component and at least one further additive selected with reference to said measured parameters.
8. The method according to claim 7 wherein the latex component is derived from a natural latex source.
9. The method according to claim 8 wherein the at least one further additive is selected with reference to measured variations in the natural latex, said measured variations being caused at least partially by seasonal variations and comprising one or more variations in conductivity, pH, ionic concentration, salts, fatty acid or phosphate content.
10. The method according to claim 1, wherein the selected components of the sealing composition are pumped into the passage.
11. The method according to claim 10, wherein pressure of the pumping is varied in response to changes in the measured parameters relating to said matrix.
12. The method according to claim 1, wherein the sealing composition is introduced into a ground formation prior to excavation of a shaft or tunnel.
13. The method of claim 1, wherein said measured parameters include temperature and a non-latex based grout component is selected if matrix temperature is less than −5° C. or greater than 100° C.
14. The method according to claim 1, wherein the measured parameters further comprise measurement and analysis of: one or more qualities of liquid present within the passage, mechanics of the matrix, and geological properties of the matrix.
15. A method of limiting or reducing permeability of a matrix to reduce or limit liquid or gas flow within a passage in the matrix with a sealing composition comprising a polymer based grout component; and a grout curing agent,
   wherein a portion of the polymer based grout component is mixed with a portion of the grout curing agent, the ratio of polymer based grout component to curing agent being selected with reference to one or more measured parameters relating to said matrix,
   wherein at least one parameter is selected from hydraulic and/or pneumatic parameters including Lugeon values,
   wherein the combined polymer based grout component and curing agent are introduced into said passage where it is set or coagulated to form a seal,
   whereby rate of curing or setting of said polymer based grout component in said passage is controlled or varied by selection of the polymer based grout component and curing agent and modifying the ratio of polymer based grout component to curing agent with respect to said one or more measured parameters in the following manner:
   establishing a baseline set of Lugeon values; and
   when an apparent Lugeon value remains the same or increases over time, setting or coagulation time of the sealing composition is reduced; or
   when the apparent Lugeon value decreases over time, the sealing composition is introduced into the passage with no changes being made to setting or coagulation time.
16. The method according to claim 15 wherein coagulation or setting is initially delayed for a predetermined period of time.
17. The method according to claim 16 wherein the initial delay of coagulation or setting is followed by coagulation or setting of the sealing composition in situ in the matrix or passage being treated, said coagulation or setting being fast relative to the initially delayed predetermined period of time.

18. The method according to claim 15 wherein the curing agent is selected from agents capable of developing or reacting with the grout component to set or coagulate the grout component in the passage.

19. The method according to claim 15 wherein the curing agent is selected from agents that are able to lower pH.

20. The method according to claim 19 wherein pH is lowered by generating acid via a reaction in situ of the combined grout component and curing agent mixture.

21. The method according to claim 20 wherein pH is lowered via oxidation of an alcohol to a carboxylic acid within an aqueous latex dispersion.

22. The method according to claim 15, wherein the curing agent is an oxidizing agent.

23. The method according to claim 22 wherein the oxidizing agent is selected from one or more of permanganate and chromium trioxide.

24. A method of limiting or reducing permeability of a matrix to reduce or limit liquid or gas flow within a passage in the matrix with a sealing composition comprising a grout component; and grout curing agent,
wherein a portion of the grout component is mixed with a portion of the grout curing agent, the ratio of grout component to curing agent being selected with reference to one or more measured parameters relating to said matrix,
wherein at least one parameter is selected from hydraulic and/or pneumatic parameters including Lugeon values wherein the combined grout component and curing agent are introduced into said passage where it is set or coagulated to form a seal,
whereby rate of curing or setting of said grout component and curing agent in said passage is controlled or varied by selection of the grout component and curing agent and modifying the ratio of grout component to curing agent with respect to said one or more measured parameters in the following manner:
establishing a baseline set of Lugeon values; and
when an apparent Lugeon value remains the same or increases over time, setting or coagulation time of the sealing composition is reduced; or
when the apparent Lugeon value decreases over time, the sealing composition is introduced into the passage with no changes being made to setting or coagulation time; and
wherein the grout component is latex based and the curing agent is a polyol selected from the group consisting of a monomeric polyol, a polymeric polyol, a fatty acid ester of a polyol, and an oxidizing agent.

25. The method according to claim 24 wherein the polyol is one or more of ethylene glycol or glycerol.

26. The method according to claim 24, wherein the polymeric polyol is polyethylene glycol.

27. The method according to claim 24, wherein said oxidizing agent is selected from one or more of permanganate and chromium trioxide.

28. A method of limiting or reducing permeability of a matrix to limit or reduce liquid or gas inflow within a passage in the matrix, the method comprising:
measuring and analyzing one or more parameters relating to said matrix, wherein at least one parameter is selected from hydraulic and/or pneumatic parameters including Lugeon values;
selecting one or more components and a concentration of the one or more components, of a multi-component sealing composition with reference to said measured parameters; and
introducing said selected components of said sealing composition into said passage where it is set or coagulated to form a seal,
whereby setting or coagulation time of the sealing composition is varied or controlled by said selection of the one or more components and the concentration of the one or more components in the following manner:
establishing a baseline set of Lugeon values; and
when an apparent Lugeon value remains the same or increases over time, setting or coagulation time of the sealing composition is reduced; or
when the apparent Lugeon value decreases over time, the sealing composition is introduced into the passage with no changes being made to setting or coagulation time,
wherein the sealing composition includes a latex component derived from a natural latex source and at least one further additive selected with reference to said measured parameters, and
wherein said at least one further additive is selected with reference to measured variations in the natural latex, said measured variations being caused at least partially by seasonal variations and comprising one or more variations in conductivity, pH, ionic concentration, salts, fatty acid or phosphate content, and wherein said further additive is selected such that coagulation or setting is initially delayed for a predetermined period of time.

29. A method of avoiding hydrofracturing of a matrix while limiting or reducing liquid or gas inflow within a passage in the matrix by sealing said passage, the method comprising:
measuring and analyzing one or more parameters relating to said matrix, said one or more parameters including rock mechanics and hydraulic and/or pneumatic parameters;
selecting one or more components and a concentration of the one or more components, of a multi-component sealing composition with reference to said measured parameters; and
injecting said selected components of said sealing composition into said passage where it is set or coagulated to form a seal,
whereby setting or coagulation time of the sealing composition is varied or controlled by said selection of the one or more components and the concentration of the one or more components,
wherein injection pressure during injection of said one or more components of the multi-component sealing composition is adjusted with reference to said measured parameters and rock mechanics.

30. The method of claim 29, wherein said sealing composition includes a latex based grout component.

31. A method of limiting or reducing permeability of a matrix to limit or reduce liquid or gas inflow relative to a structure in the matrix, the method comprising:
measuring and analyzing one or more parameters relating to said matrix, wherein at least one parameter is selected from hydraulic and/or pneumatic parameters;
selecting one or more components and a concentration of the one or more components, of a multi-component sealing composition with reference to said measured parameters;

drilling a series of primary injection holes around the structure or proposed structure and introducing said selected components of said sealing composition through said primary injection holes where it is set or coagulated to form a seal in the form of a curtain around the structure or proposed structure; and drilling a series of secondary injection holes between the primary injection holes to measure seal effectiveness, whereby setting or coagulation time of the sealing composition to form a curtain around the structure or proposed structure is varied or controlled by said selection of the one or more components and the concentration of the one or more components.

32. The method according to claim 31, wherein the measured parameters further comprise measurement and analysis of: one or more qualities of liquid present within the passage, mechanics of the matrix, and geological properties of the matrix.

33. A method of limiting or reducing permeability of a matrix to limit or reduce liquid or gas inflow relative to a structure in the matrix, the method comprising:

measuring and analyzing one or more parameters relating to said matrix, wherein at least one parameter is selected from hydraulic and/or pneumatic parameters including Lugeon values;

selecting one or more components and a concentration of the one or more components, of a multi-component sealing composition with reference to said measured parameters;

drilling a series of primary injection holes around the structure or proposed structure and introducing said selected components of said sealing composition through said primary injection holes where it is set or coagulated to form a seal in the form of a curtain around the structure or proposed structure; and drilling a series of secondary injection holes between the primary injection holes to measure seal effectiveness, whereby setting or coagulation time of the sealing composition to form a curtain around the structure or proposed structure is varied or controlled by said selection of the one or more components and the concentration of the one or more components in the following manner:

establishing a baseline set of Lugeon values; and when an apparent Lugeon value remains the same or increases over time, setting or coagulation time of the sealing composition is reduced; or when the apparent Lugeon value decreases over time, the sealing composition is introduced into the passage with no changes being made to setting or coagulation time.

34. A method of avoiding hydrofracturing of a matrix while limiting or reducing liquid or gas inflow within a passage in the matrix by sealing said passage, the method comprising:

measuring and analyzing one or more parameters relating to said matrix, said one or more parameters including rock mechanics and hydraulic and/or pneumatic parameters including Lueon values;

selecting one or more components and a concentration of the one or more components, of a multi-component sealing composition with reference to said measured parameters; and injecting said selected components of said sealing composition into said passage where it is set or coagulated to form a seal, whereby setting or coagulation time of the sealing composition is varied or controlled by said selection of the one or more components and the concentration of the one or more components in the following manner:

establishing a baseline set of Lugeon values; and when an apparent Lugeon value remains the same or increases over time, setting or coagulation time of the sealing composition is reduced; or when the apparent Lugeon value decreases over time, the sealing composition is introduced into the passage with no changes being made to setting or coagulation time wherein injection pressure during injection of said one or more components of the multi-component sealing composition is adjusted with reference to said measured parameters including Lugeon values as a function of time and rock mechanics.

* * * * *